United States Patent
Hutton et al.

(10) Patent No.: US 9,710,281 B2
(45) Date of Patent: *Jul. 18, 2017

(54) REGISTER COMPARISON FOR OPERAND STORE COMPARE (OSC) PREDICTION

(71) Applicant: International Business Machines Corporation, Armonk, NY (US)

(72) Inventors: David Hutton, Tallahassee, FL (US); Wen Li, Poughkeepsie, NY (US); Eric Schwarz, Gardiner, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/813,796

(22) Filed: Jul. 30, 2015

(65) Prior Publication Data

US 2017/0031687 A1   Feb. 2, 2017

(51) Int. Cl.
*G06F 9/30* (2006.01)
*G06F 9/38* (2006.01)

(52) U.S. Cl.
CPC ........ *G06F 9/3867* (2013.01); *G06F 9/30021* (2013.01); *G06F 9/30043* (2013.01); *G06F 9/30058* (2013.01); *G06F 9/30079* (2013.01); *G06F 9/30101* (2013.01); *G06F 9/30145* (2013.01); *G06F 9/3838* (2013.01)

(58) Field of Classification Search
None
See application file for complete search history.

(56) References Cited

U.S. PATENT DOCUMENTS

| 5,099,416 A | 3/1992 | Tanaka et al. |
| 7,533,242 B1 * | 5/2009 | Moll .................... G06F 12/0862 711/213 |
| 7,975,130 B2 * | 7/2011 | Alexander ............ G06F 9/3016 712/219 |

(Continued)

OTHER PUBLICATIONS

IBM et al.; "Enhanced Implementation of Compare-and-Swap"; An IP.com Prior Art Database Technical Disclosure; http://ip.com/IPCOM/000106578; Mar. 21, 2005; 5 pages.

(Continued)

*Primary Examiner* — Corey S Faherty
(74) *Attorney, Agent, or Firm* — Cantor Colburn LLP; Margaret A. McNamara

(57) ABSTRACT

Embodiments relate to register comparison for register comparison for operand store compare (OSC) prediction. An aspect includes, for each instruction in an instruction group of a processor pipeline: determining a base register value of the instruction; determining an index register value of the instruction; and determining a displacement of the instruction. Another aspect includes comparing the base register value, index register value, and displacement of each instruction in the instruction group to the base register value, index register value, and displacement of all other instructions in the instruction group. Another aspect includes based on the comparison, determining that a load instruction of the instruction group has a probable OSC conflict with a store instruction of the instruction group. Yet another aspect includes delaying the load instruction based on the determined probable OSC conflict.

17 Claims, 4 Drawing Sheets

(56) References Cited

U.S. PATENT DOCUMENTS

| | | |
|---|---|---|
| 8,195,924 B2 | 6/2012 | Alexander et al. |
| 2009/0210675 A1 | 8/2009 | Alexander et al. |
| 2011/0276764 A1 | 11/2011 | Alexander et al. |

OTHER PUBLICATIONS

IBM et al.; "Using Level of Conditionality to Monitor Operand Store Compare"; An IP.com Prior Art Database Technical Disclosure; http://ip.com/IPCOM/000103721; Mar. 18, 2005; 5 pages.
List of IBM Patents or Patent Applications Treated as Related; Jul. 31, 2015; pp. 1-2.
David Hutton, et al., "Register Comparison for Operand Store Compare (OSC) Prediction", U.S. Appl. No. 15/132,649, filed Apr. 19, 2016.
List of IBM Patents or Patent Applications Treated as Related; (Appendix P) Filed Jul. 28, 2016, 2 pages.

\* cited by examiner

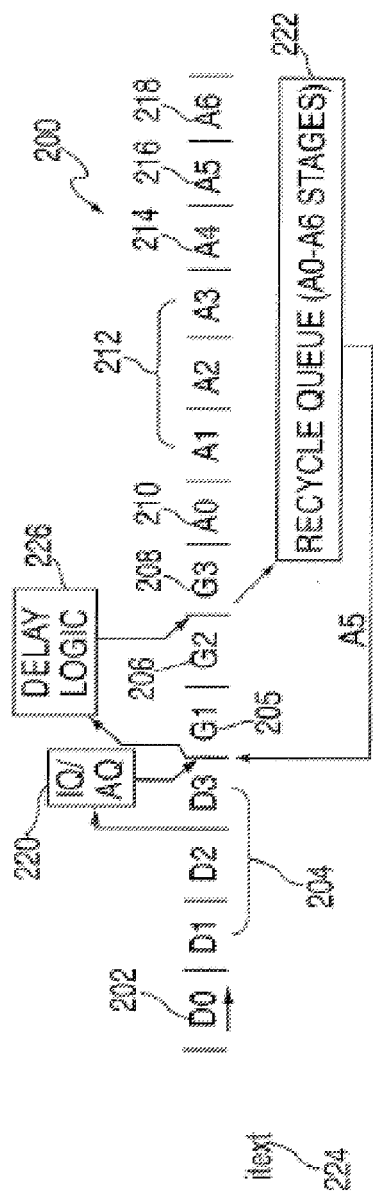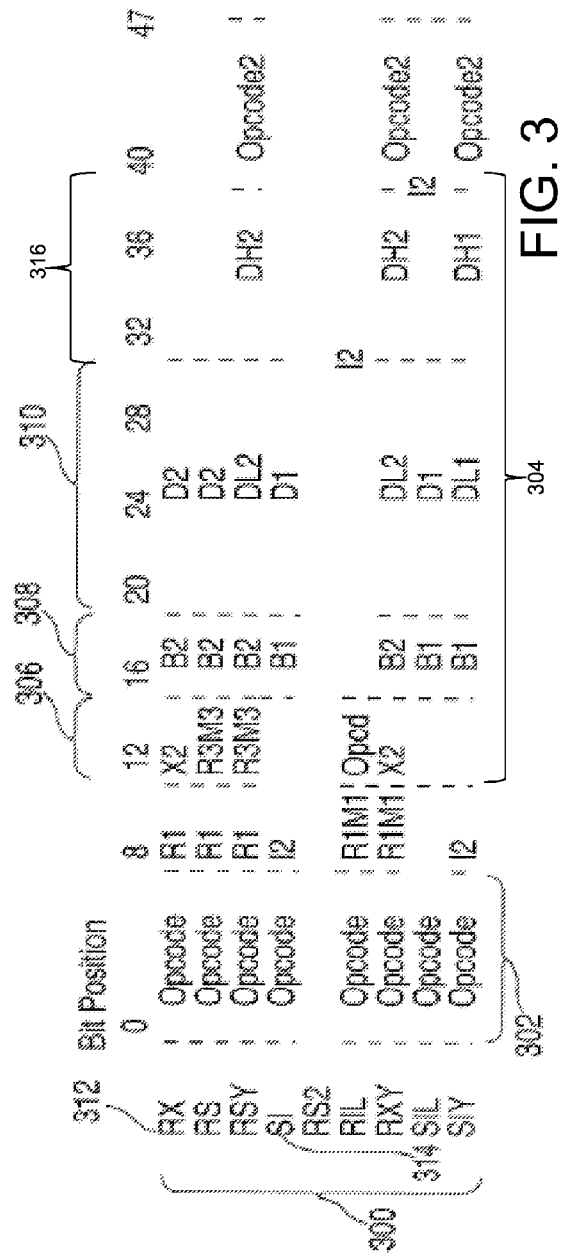

REGISTER COMPARISON FOR OPERAND STORE COMPARE (OSC) PREDICTION

BACKGROUND

This invention relates generally to operand store compare (OSC) prediction, and more particularly to register comparison for OSC prediction.

As computer system designers seek to continually improve processor performance, it is beneficial to develop approaches that reduce cycles per instruction (CPI). Operand store compare (OSC) penalties can be a large contributor to high CPI numbers. OSC is defined as encountering an instruction with an operand to store data to memory followed by an instruction to load the same data from the memory before the stored data actually reaches the memory. As a stream of instructions progresses through a processor pipeline, various control units perform tasks such as fetching instructions, dispatching instructions, calculating address values, accessing registers, fetching operands, executing instructions, checking for error conditions, and retiring the instructions including storing the results. When instructions advance deeper through the pipeline, dependency conditions, conflicts, incorrectly predicted branches, and the like, can stall progress of the instructions through the pipeline as the conditions are handled. A problem with OSC is that occurrence of the condition is unknown until a cache address is formed, which may be after the instruction has already been dispatched, requiring costly stall/reset mechanisms. For instance, when load store (LS) logic detects an OSC, it then rejects/recycles the load instruction and holds it from dispatching again until the storage data reaches a point where it can be bypassed (or read) by the load instruction. The penalty of such a reject can be many (e.g., 9) cycles of unused processing time. Compilers that generate the instructions typically try to distance instructions that store and load the same data sufficiently to minimize the OSC penalty. However, if the distance between the store and load is not large enough, the load can still be rejected in the processor pipeline. The distance between two instructions is defined by the number of cycles between dispatches of the two instructions. The distance is zero if the store and load are grouped and dispatched together, for instance, in a super-scalar architecture.

SUMMARY

Embodiments include a method, system, and computer program product for register comparison for operand store compare (OSC) prediction. An aspect includes, for each instruction in an instruction group of a processor pipeline: determining a base register value of the instruction; determining an index register value of the instruction; and determining a displacement of the instruction. Another aspect includes comparing the base register value, index register value, and displacement of each instruction in the instruction group to the base register value, index register value, and displacement of all other instructions in the instruction group. Another aspect includes based on the comparison, determining that a load instruction of the instruction group has a probable OSC conflict with a store instruction of the instruction group. Yet another aspect includes delaying the load instruction based on the determined probable OSC conflict.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 2 depicts a processor pipeline, delay logic, and recycle queue for register comparison for OSC prediction in accordance with an embodiment;

FIG. 3 depicts instruction formats in accordance with an embodiment;

DETAILED DESCRIPTION

Figure 1:
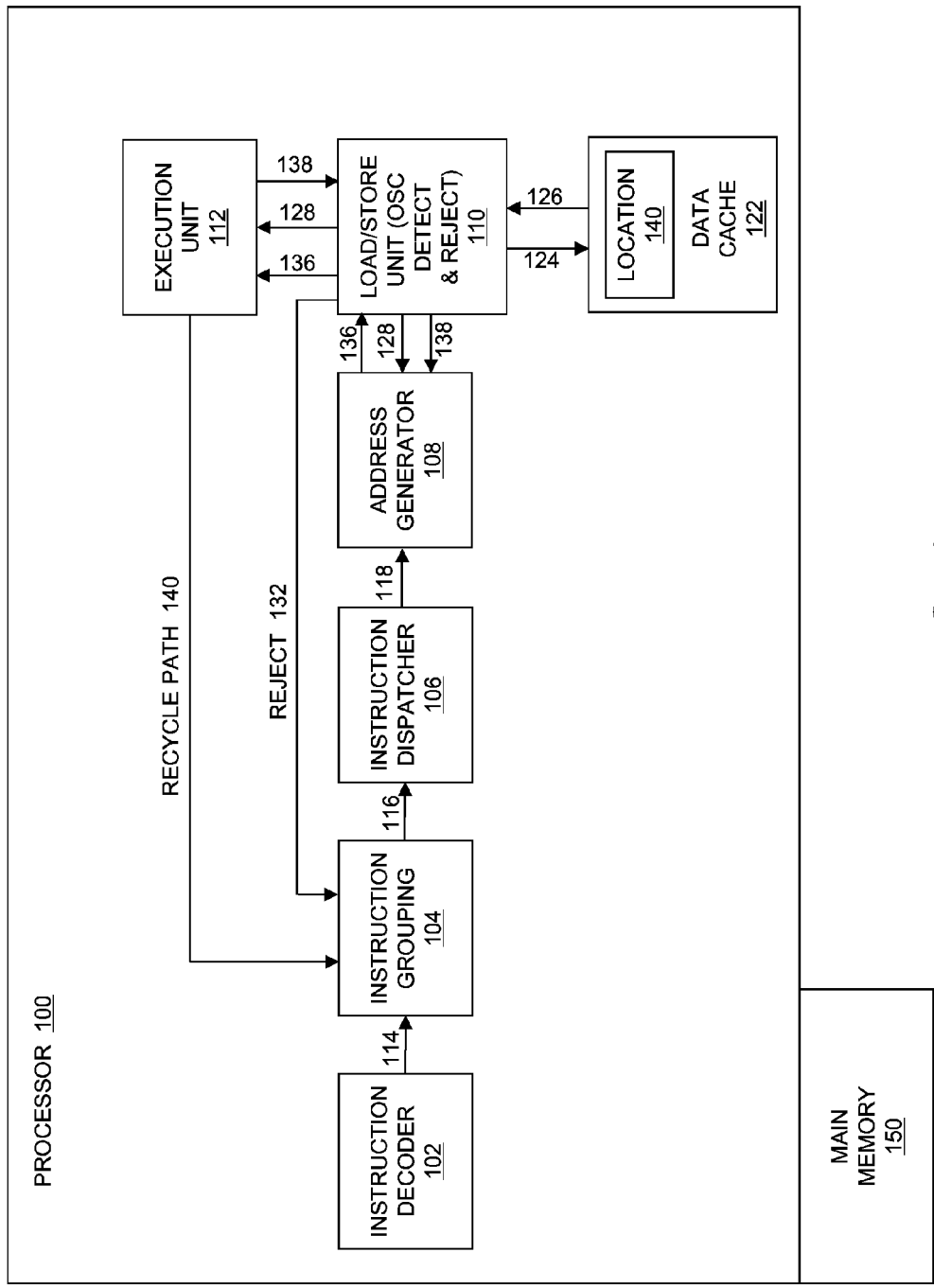
FIG. 1 depicts a system for register compare for OSC prediction in accordance with an embodiment.

Embodiments of register comparison for OSC prediction are provided, with exemplary embodiments being discussed below in detail. Identification of probable OSC conflicts relatively early in the pipeline using register comparison reduces associated delays. Register comparison for OSC prediction does not require additional memory for storing accumulated instruction history, but rather takes advantage of access to instruction text as it moves through pipeline stages. At decode time, the base register, index register, and displacement of each instruction currently in the pipeline are compared to one another, allowing detection of OSC conflicts independent of instruction format. For each instruction that does not have a base register and/or index register value defined, the base register and/or index register value for that instruction may be set to a default value, such as zero, for purposes of the comparison, such that instructions in any format may be compared to one another to predict probable OSC conflicts. The terms base register value and index register value, as used herein, refer to the identifier of a referenced General Purpose Register (GPR), and not to the contents of the GPR. This register value is a 4 bit field in the instruction text sometimes called the register number. In various embodiments of register comparison for OSC prediction, all of the instructions, including all load and store instructions, in an instruction group in the pipeline are compared to each other, regardless of instruction format. Further, in some embodiments, instructions may be compared across different instruction groups.

OSC is also referred to as Store Hit Load (SHL), and relates to dependency on memory data between a store and a load instruction. There are dynamic and static techniques for predicting OSC conflicts. Dynamic techniques use a table of addresses that have had prior OSC conflicts, while static techniques have no history of prior executions and only utilize recent decoded instruction text. Embodiments of register comparison for OSC prediction implement static prediction of probable OSC conflicts. In some embodiments, the prediction is suppressed based on decoding of a prediction override instruction in between the load and store. The static OSC prediction technique may sometimes need to be overridden by a programmer, so the override instruction is provided to disable OSC prediction if an override is located in the instruction stream in between the store and the load that may have a probable OSC conflict.

Loads and stores with common fields may be compared to each other as described in U.S. Pat. No. 7,975,130 (Alexander et al., filed Feb. 20, 2008, which is herein incorporated by reference in its entirety), but this may not catch all the possible combinations of loads and stores. Some instructions may utilize an instruction format with more fields than needed. Therefore, all register-based fetch and store operand specifying instruction formats may be compared to detect OSC conflicts using register based comparison. In some embodiments, data from any of positions 8 to 47 in an instruction, which may include a length field and operand fields, may be used in the comparison.

Register comparison for OSC prediction treats all loads and stores alike, and compares a base register field (B), an index register field (X), and a displacement field (D) of each instruction at dispatch time. For instruction formats that do not have some of these fields, the absent fields are assumed to be a default value such as zero. The instruction text is created in the G1 cycle, then in the G2 cycle any store and load instructions, independent of whether they have a compatible instruction format, are compared. A generic compare is done for all stores and all loads using the B, X, and D fields. This may result in relatively fast timing of the circuits and cover a relatively large number of instruction formats.

In some embodiments, the low bits of the displacement field may be masked for the comparison to detect the case of a not exact overlap between instructions. For example, masking may apply to decimal data in memory when the sign digit of the data may be manipulated without modifying the whole number. Additional logic may mask the lower four bits of the displacements in two instructions that are being compared if either, but not both, of the load or the store accesses exactly one byte of storage. For example, masking may be required to compare a one byte store character instruction (STC) with a displacement of xx5 against a four byte load L with a displacement of xx4. The compare knows, based on the opcode of the STC, that the STC instruction accesses exactly one byte. If both the STC and the L have the same B and X fields in their respective instruction text (itext), then, in this example, the STC is directed to storage location 5 while L is directed to storage locations 4, 5, 6, and 7. If the lower 4 bits of L are not masked (or, in this specific case, the lowest bit only), then the compare would incorrectly fail since the displacements differ despite the actual storage accessed by each overlapping. However, because it is known that the STC accesses exactly one byte of storage and the L accesses additional storage locations, both displacements are masked to xx0 before comparison, allowing the OSC issue between STC and L to be detected by the comparison. In various embodiments, the lowest 4 bits of the displacement may be masked; in other embodiments, any appropriate number of lowest bits of the displacement may be masked.

In another example, an instruction that uses signed-packed decimal format holds the sign in the rightmost nibble in the rightmost byte, and often only the sign is modified. Therefore, the displacement is masked when comparing a packed-decimal instruction accessing exactly one byte against another instruction that accesses more than one byte. In this example, for the sign-packed decimal operation, the length must be examined to know that the instruction only accesses one byte. In various embodiments, if one of the load or the store accesses that are being compared are directed to exactly one byte but the other is not, the lower four bits of the displacement should be masked to increase the odds of the OSC comparison successfully detecting any OSC conflicts.

Turning now to FIG. 1, a system is depicted that includes multiple functional units to support pipelining of instructions in a computer processor 100. The processor 100 is part of a computer system comprising the processor 100 and a main memory 150 that is in communication with the processor 100. Pipelining can increase instruction execution throughput by performing stages such as fetching, decoding, execution and completion concurrently for multiple instructions in an instruction stream. In an exemplary embodiment, functional units in the processor 100 include: instruction decoder 102, instruction grouping 104, instruction dispatcher 106, address generator 108, load store unit 110, and execution unit 112. It will be understood that additional functional units can be included in the processor 100 which are not depicted, such as an instruction fetching unit, a completion unit, a recovery unit, and the like. Multiple communication paths can be used to communicate between each of the functional units 102-112. The communication paths may vary in bus width (single-bit to multi-bit) and can be unidirectional or bidirectional. For example, path 114 passes instruction text (itext) in an instruction stream from the instruction decoder 102 to instruction grouping 104. The instruction grouping 104 determines whether instructions can be grouped together for parallel processing, for example, using a super-scalar architecture. The instruction grouping 104 can create itext based OSC dependencies on older store instructions that have progressed into later pipeline stages (e.g., in functional units 106-112). The instruction grouping 104 passes itext including any groups formed via path 116 to instruction dispatcher 106. In an exemplary embodiment, the instruction dispatcher 106 delays dispatching of a load instruction when a store instruction with a potential OSC condition has been identified. The instruction dispatcher 106 dispatches itext, maintaining dependencies via path 118 to address generator 108. The address generator 108 determines actual address values, which may be calculated using a combination of base, index, and displacement fields from itext in the instruction stream. The address generator 108 sends itext with operand address information to the load store unit 110 via path 120.

The load store unit 110 can access a data cache 122 via path 124 and receives data from the data cache 122 via path 126. In an exemplary embodiment, the load store unit 110 performs actual OSC detection, monitoring actual load and store accesses to the data cache 122. When the load store unit 110 detects that an operand load has been requested for a location 140 in the data cache 122 that has not completed a store operation, the load store unit 110 declares a reject condition for the associated instruction, since it cannot complete. The reject condition is forwarded to execution unit 112 via path 128 and returned to address generator 108 via path 130 and to instruction grouping 104 via path 132. Additionally, the load store unit 110 can feed information back to the address generator 108 via path 134, and forward information to the execution unit 112 via path 136. The execution unit 112 can also send data to the load store unit 110 via path 138 and send itext back to the instruction grouping 104 via recycle path 140. Although the paths 130 and 134, as well as paths 136 and 128, are depicted as separate paths, it will be understood that paths can be combined within the scope of the invention.

Turning now to FIG. 2, a block diagram of an instruction stream in a processor pipeline 200 is depicted in accordance with an exemplary embodiment. Stages of the processor pipeline 200 include D0 202 to transfer fetched instructions for decoding, D1 through D3 204 to decode instructions (e.g., instruction decoder 102 of FIG. 1), G1 205 and G2 206 to group instructions (e.g., grouping stages in instruction grouping 104 of FIG. 1), G3 208 to dispatch instructions (e.g., instruction dispatcher 106 of FIG. 1), A0 210 to perform address generation (e.g., address generator 108 of FIG. 1), A1 through A3 212 for cache access (e.g., load store unit 110 of FIG. 1), A4 214 to execute instructions (e.g., execution stage 112 of FIG. 1), A5 216 to start the put away of results or recycle instructions on failure conditions, and A6 218 to retire instructions.

As instructions advance in decoding stages D1 through D3 204, an instruction queue and address queue (IQ/AQ) 220 may be used to expand itext 224 into greater levels of detail for processing. The expansion adds additional control and status information associated with the itext 224. Delay logic 226, which may also be referred to as dependency forcing logic, monitors movement of the itext 224 into the G1 205 stage and identifies fields that may be used for operand address calculation. If a store instruction is identified, the delay logic 226 monitors for a subsequent load instruction with potential overlap in operand fields that include operand address information. When an overlap is detected, the delay logic can hold the load instruction for up to a designated number of cycles to provide adequate time for the Store instruction to at least be able to support forwarding to a dependent Load. Delaying the Load instruction proactively, rather than waiting for an actual non-forwardable OSC to be detected later in the pipeline once address generation is performed, prevents rejection of the load instruction. This Load to Store dependency tracking and stalling is applied for each Store in the window of influence. The delay logic 226 may be performed in instruction decoder 102, instruction grouping 104, or instruction dispatcher 106 in FIG. 1. The instruction queue and address queue (IQ/AQ) 220 can be used to store decoded instruction text if the grouping stages are blocked.

Recycle queue 222 retains instruction information for use in the cases where a retry of an instruction if necessary. Upon determining that there is a need to reject the dependent Load, the rejected instruction is returned to an earlier position in the processor pipeline 200 via recycle path 228. In an exemplary embodiment, actual OSC rejects due to OSC occurs in A5 216.

When delay logic 226 forces a dependency between the store and the load, the load's issue is delayed until the store advances far enough in execution that the store's data may be properly bypassed to the load to avoid an operand-store-compare (OSC) reject. Without the dependency the load may issue too quickly, resulting in the load being rejected and taking longer to complete. The issuing of the load is delayed because of the forced dependency that is caused by delay logic 226.

Turning now to FIG. 3, some examples of instruction formats 300 are depicted in accordance with various embodiments. Each row in the instruction formats 300 includes instruction text (itext) formatting for a particular instruction format in the instruction formats 300. Fields are defined relative to bit positions. For example, bits positions 0 to 7 represent opcodes 302. Bit positions 12 through 39 can contain operand address information 304 that may also include other information depending upon each instruction format. The operand address information 304 may include operands for the opcodes 302, such as an index field 306, a base field 308, a displacement field 310, and/or a high displacement field 316. The index field 306, base field 308, displacement field 310, and/or high displacement field 316 can be combined to form a value used to detect a potential OSC. The index and base fields, 306 and 308, represent the number of a General Purpose Register (GPR) to be utilized in Address generation. In cases where either field is not utilized by the instruction it is set to "0000". Each format in the instructions formats 300 may provide formatting for both load and store instructions. For example, the delay logic 226 of FIG. 2 can identify load and store instructions formatted in RX format 312. The identification and comparison of operand address information 304 for load and store instructions can be performed across formats, such as a load instruction in RX format 312 and a store instruction in SI 314 format. The delay logic 226 may further compare any data from bit positions 8 to 47, as needed, using register-based comparison.

Figure 4:
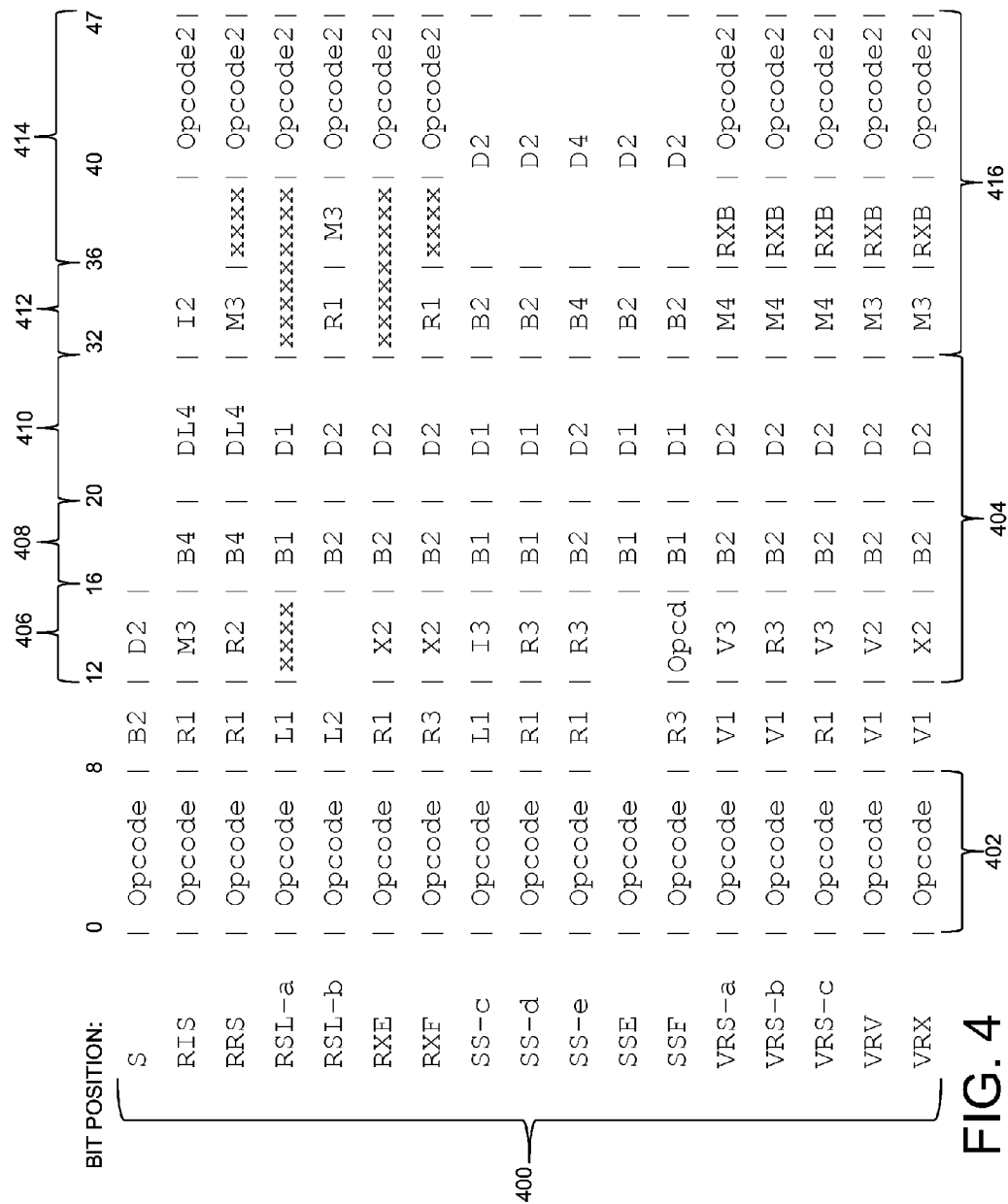
FIG. 4 depicts further instruction formats in accordance with an embodiment.

FIG. 4 illustrates further examples of instruction formats 400 in accordance with various embodiments. Each row in the instruction formats 400 includes instruction text (itext) formatting for a particular instruction format in the instruction formats 400. Fields are defined relative to bit positions. For example, bits positions 0 to 7 represent opcodes 402. Bit positions 12 through 31 can contain operand address information 404 for a first memory operand that may also include other information depending upon each instruction format. The operand address information 404 may include operands for the opcodes 402, such as an index field 406, a base field 408, and/or a displacement field 410. The index field 406, base field 408, and/or displacement field 410 can be combined to form a value used to detect a potential OSC. The index and base fields, 406 and 408, represent the number of a GPR to be utilized in address generation. In cases where either field is not utilized by the instruction it is set to "0000". Each format in the instructions formats 400 may provide formatting for both load and store instructions and may identify up to two memory operands. Bit positions 32 through 47 may contain operand address information 416 for a second memory operand that may also include other information depending upon each instruction format. The second operand address information 416 may include a base field 412 and/or a displacement field 414. The base field 412 and/or displacement field 414 can be combined to form a value used to detect a potential OSC. The base field 412 represent the number of a GPR to be utilized in address generation. For second operand address there is no index field utilized by the instruction and it is set to "0000". The delay logic 226 of FIG. 2 can identify load and store instructions formatted in any of the formats listed in FIG. 4 and directly compare the operand address information 404 and/or 416 associated with each instruction, a subset of fields (e.g., base fields 408) or a combination of fields to detect a potential OSC. The identification and comparison of operand address information 404 and/or 416 for load and store instructions can be performed across formats. The delay logic 226 may further compare any data from bit positions 8 to 47, as required, using register-based comparison.

Figure 5:
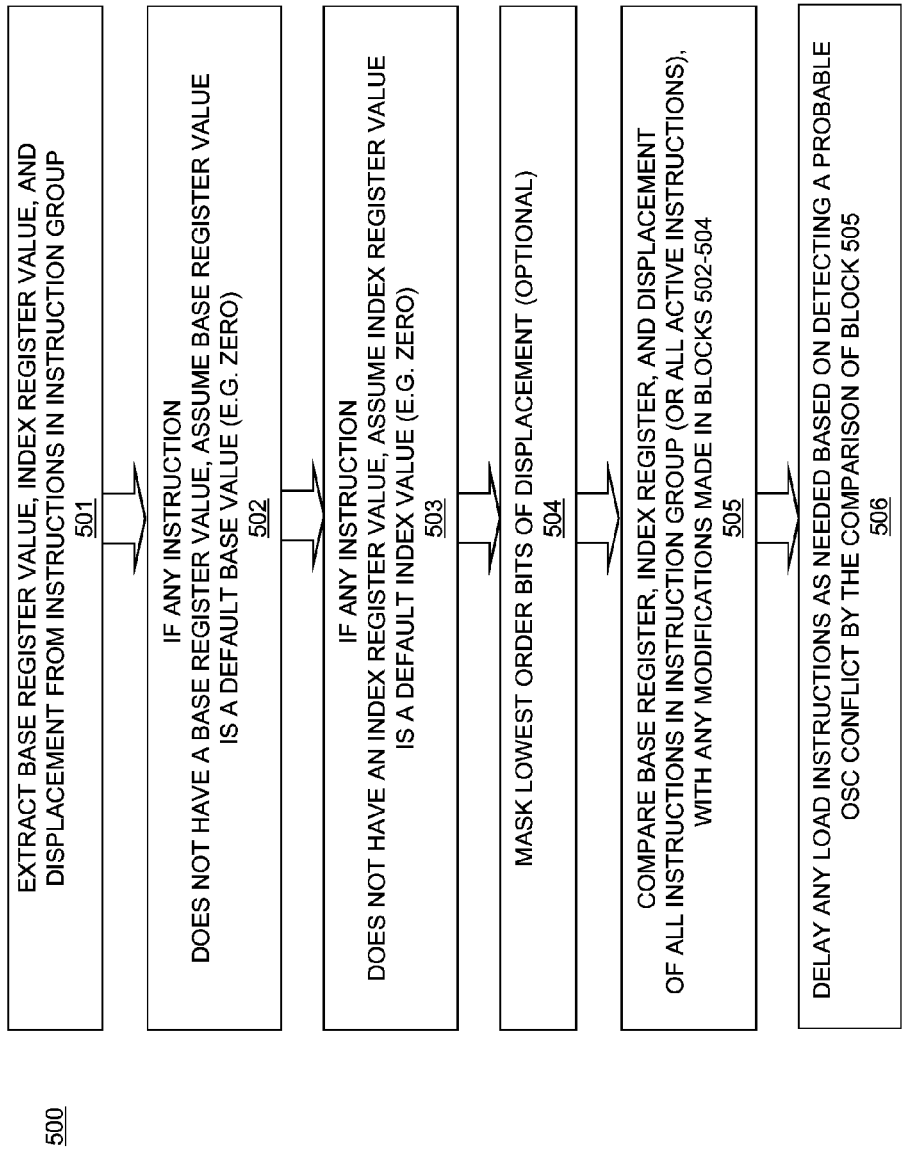
FIG. 5 depicts a process flow for register comparison for OSC prediction in accordance with an embodiment.

FIG. 5 illustrates an embodiment of a method 500 for register based OSC prediction. Embodiments of method 500 of FIG. 5 may be implemented in embodiments of delay logic 226 of FIG. 2. First, in block 501, the base register value B, index register value X, and displacement D are extracted from each of the load instructions and store instructions in an instruction group at decode time in a processor pipeline. The load and store instructions may be in any of the instruction formats 300 and 400 shown in FIGS. 3-4. Next, in block 502, if any of the load or store instructions in the instruction group do not have a base register value B, the base register value B for the instruction(s) that does not have a base register value B is set equal to a default value such as zero. In block 503, if any of the load or store instructions in the instruction group do not have an index register value X, the index register value X for the instruction(s) that does not have an index register value X is set equal to a default value such as zero. In block 504, in some embodiments, a number of the lowest order bits of the displacement D are masked in the load and store instructions of the instruction group. In some embodiments, the lowest 4 bits of the displacement are masked. The lowest bits of the displacement may be masked based on a determination of an amount of data targeted by a store instruction; for example, a store instruction may only target a single byte of data, such that the masking allows comparison of the store instruction to a load instruction that targets more bytes of data. In some embodiments, the length fields of the store instructions in the instruction group are checked to determine the amount of data being stored, so as to determine whether masking is needed. In some embodiments of method 500, block 504 may be omitted. In block 505, the B, X, and D values for each of the load and store instructions in the instruction group are compared to each other, with any modifications that were made in blocks 502-504, and it is determined whether there are any OSC conflicts in the instruction group based on the comparison. In block 506, if it was determined in block 505 that there is a probable OSC conflict between a load and a store instruction in the instruction group based on the comparison of block 505, the load instruction that has the OSC conflict is delayed as described above with respect to FIG. 2. Method 500 may be repeated in each cycle by delay logic 226 for each instruction group that proceeds through the pipeline.

In further embodiments of blocks 505-506 of method 500, instructions may be compared across instruction groups. An instruction group refers to how instructions are tracked together for exceptions, or to a number of instructions that are dispatched in the same cycle. In an example, an instruction group may be 3 instructions, and 6 instructions (or 2 instruction groups) may be dispatched per cycle. Instructions may be compared across instruction groups and across multiple cycles. For example, stores may be active in the core for multiple cycles; therefore, register based OSC prediction may track active stores and compare the active stores against new loads in different instruction groups.

In some embodiments of method 500, encountering an override instruction in the instruction group that is located between a load and a store may turn the comparison of the load and the store off, such that method 500 is not performed for a load and a store that have an override instruction located between them. The OSC prediction of method 500 is suppressed based detecting, at decode, of an override instruction in between the load and store. The static OSC prediction technique may sometimes need to be overridden by a programmer, so the override instruction is provided to disable OSC prediction if an override is located in the instruction stream in between the store and the load that may have a probable OSC conflict.

Technical effects and benefits include relatively fast OSC prediction independent of instruction format.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for register comparison for operand store compare (OSC) prediction, the method comprising:
   for each instruction in an instruction group of a processor pipeline:
      determining a base register value of the instruction;
      determining an index register value of the instruction; and
      determining a displacement of the instruction;
   comparing the base register value, the index register value, and the displacement of each instruction in the instruction group to the base register value the index register value, and the displacement of each other instruction in the instruction group;
   based on the comparison, determining that a first load instruction of the instruction group has a probable OSC conflict with a first store instruction of the instruction group;
   delaying the load instruction based on the determined probable OSC conflict;
   encountering a prediction override instruction located between a second load instruction and a second store instruction of the instruction group; and
   turning off OSC prediction for the second load instruction and the second store instruction.

2. The method of claim 1, wherein the instruction group is a first instruction group, the method further comprising:
   comparing the base register value, the index register value, and the displacement of each instruction in the first instruction group to a base register value, an index register value, and a displacement of each instruction in a second instruction group; and
   determining that the load instruction of the first instruction group has a probable OSC conflict with a store instruction of the second instruction group; and
   delaying the load instruction based on the determined probable OSC conflict with the store instruction of the second instruction group.

3. The method of claim 1, further comprising:
   determining that an instruction of the instruction group does not have a base register value; and
   based on determining that the instruction does not have a base register value, setting the base register value of the instruction equal to a default value for the comparing.

4. The method of claim 3, wherein the default value is zero.

5. The method of claim 1, further comprising:
   determining that an instruction of the instruction group does not have an index register value; and
   based on determining that the instruction does not have an index register value, setting the index register value of the instruction equal to a default value for the comparing.

6. The method of claim 5, wherein the default value is zero.

7. The method of claim 1, further comprising masking a set of lowest order bits of the displacement of each instruction before performing the comparing.

8. The method of claim 7, wherein a number of the set of lowest order bits that are masked is four.

9. A computer program product for implementing register comparison for operand store compare (OSC) prediction, the computer program product comprising:
   a computer readable storage medium having program instructions embodied therewith, the program instructions readable by a processing circuit to cause the processing circuit to perform a method comprising:
   for each instruction in an instruction group of a processor pipeline:
      determining a base register value of the instruction;
      determining an index register value of the instruction; and
      determining a displacement of the instruction;
   comparing the base register value, the index register value, and the displacement of each instruction in the instruction group to the base register value the index register value, and the displacement of each other instruction in the instruction group;

based on the comparison, determining that a first load instruction of the instruction group has a probable OSC conflict with a first store instruction of the instruction group;

delaying the load instruction based on the determined probable OSC conflict;

encountering a prediction override instruction located between a second load instruction and a second store instruction of the instruction group; and turning off OSC prediction for the second load instruction and the second store instruction.

10. The computer program product of claim 9, wherein the instruction group is a first instruction group, the method further comprising:

comparing the base register value, the index register value, and the displacement of each instruction in the first instruction group to a base register value, an index register value, and a displacement of each instruction in a second instruction group; and determining that the load instruction of the first instruction group has a probable OSC conflict with a store instruction of the second instruction group; and delaying the load instruction based on the determined probable OSC conflict with the store instruction of the second instruction group.

11. The computer program product of claim 9, the method further comprising:

determining that an instruction of the instruction group does not have a base register value; and based on determining that the instruction does not have a base register value, setting the base register value of the instruction equal to a default value for the comparing.

12. The computer program product of the claim 9, the method further comprising:

determining that an instruction of the instruction group does not have an index register value; and based on determining that the instruction does not have an index register value, setting the index register value of the instruction equal to a default value for the comparing.

13. The computer program product of claim 9, the method further comprising masking a set of lowest order bits of the displacement of each instruction before performing the comparing.

14. A computer system for register comparison for operand store compare (OSC) prediction, the system comprising:

a memory storing computer-executable instructions; and a processor, communicatively coupled to said memory, the processor configured to execute the computer-executable instructions to perform a method comprising:

for each instruction in an instruction group of a processor pipeline:

determining a base register value of the instruction;

determining an index register value of the instruction; and determining a displacement of the instruction;

comparing the base register value, the index register value, and the displacement of each instruction in the instruction group to the base register value the index register value, and the displacement of each other instruction in the instruction group;

based on the comparison, determining that a first load instruction of the instruction group has a probable OSC conflict with a first store instruction of the instruction group;

delaying the load instruction based on the determined probable OSC conflict;

encountering a prediction override instruction located between a second load instruction and a second store instruction of the instruction group; and turning off OSC prediction for the second load instruction and the second store instruction.

15. The system of claim 14, wherein the instruction group is a first instruction group, the method further comprising:

comparing the base register value, the index register value, and the displacement of each instruction in the first instruction group to a base register value, an index register value, and a displacement of each instruction in a second instruction group; and determining that the load instruction of the first instruction group has a probable OSC conflict with a store instruction of the second instruction group; and delaying the load instruction based on the determined probable OSC conflict with the store instruction of the second instruction group.

16. The system of claim 14, the method further comprising:

determining that an instruction of the instruction group does not have a base register value; and based on determining that the instruction does not have a base register value, setting the base register value of the instruction equal to a default value for the comparing.

17. The system of claim 14, the method further comprising:

determining that an instruction of the instruction group does not have an index register value; and based on determining that the instruction does not have an index register value, setting the index register value of the instruction equal to a default value for the comparing.

* * * * *